US009396261B2

(12) United States Patent
Madhavan et al.

(10) Patent No.: US 9,396,261 B2
(45) Date of Patent: Jul. 19, 2016

(54) SYSTEM FOR SERVING DATA THAT MATCHES CONTENT RELATED TO A SEARCH RESULTS PAGE

(75) Inventors: Anand Madhavan, Milpitas, CA (US); Shyam Kapur, Sunnyvale, CA (US); Matthew Carinio, San Luis Obispo, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1375 days.

(21) Appl. No.: 11/789,779

(22) Filed: Apr. 25, 2007

(65) Prior Publication Data

US 2008/0270359 A1  Oct. 30, 2008

(51) Int. Cl.
*G06F 17/30* (2006.01)
*G06Q 30/02* (2012.01)

(52) U.S. Cl.
CPC .......... *G06F 17/30864* (2013.01); *G06Q 30/02* (2013.01)

(58) Field of Classification Search
CPC .......................... G06F 17/30864; G06Q 30/02
USPC ............ 707/1–4, 999.1–4, 14.4, 14.69, 14.73
See application file for complete search history.

(56) References Cited

U.S. PATENT DOCUMENTS

| 5,583,763 | A | 12/1996 | Atcheson et al. |
| 5,784,059 | A | 7/1998 | Morimoto et al. |
| 5,991,735 | A | 11/1999 | Gerace |
| 6,006,221 | A | 12/1999 | Liddy et al. |
| 6,009,409 | A | 12/1999 | Adler et al. |
| 6,026,368 | A | 2/2000 | Brown et al. |
| 6,076,088 | A | 6/2000 | Paik et al. |
| 6,102,969 | A | 8/2000 | Christianson et al. |
| 6,269,361 | B1 | 7/2001 | Davis et al. |
| 6,324,519 | B1 | 11/2001 | Eldering .......................... 705/14 |
| 6,363,373 | B1 | 3/2002 | Steinkraus |
| 6,377,935 | B1 | 4/2002 | Deaton et al. |
| 6,401,075 | B1 | 6/2002 | Mason et al. |

(Continued)

FOREIGN PATENT DOCUMENTS

| JP | 2001-142972 A | 5/2001 |
| JP | 2002-083173 A | 3/2002 |

(Continued)

OTHER PUBLICATIONS

B. Edelman et al. Internet advertising and the generalized second price auction: Selling billions of dollars worth of keywords. NBER working paper 11765, Nov. 2005. at http://rwj.berkeley.edu/schwarz/publications/gsp051003.pdf (last visited Jun. 29, 2007), 21 pages.

(Continued)

*Primary Examiner* — Leslie Wong
(74) *Attorney, Agent, or Firm* — Brinks Gilson & Lione

(57) ABSTRACT

A system is described for serving data matching content in a search engine marketing system. The system may include a processor, an interface and a memory. The memory may be operatively connected to the processor and may store a page, a content related to the page, a set of terms and a data. The interface may be operatively connected to the memory and the processor and may be used to communicate with a user. The processor may identify a page and a content, perform a semantic analysis on the content to generate a set of terms, match the set of terms to a data, add the data to the page, and the serve the page to a user via the interface.

16 Claims, 9 Drawing Sheets

(56) References Cited

U.S. PATENT DOCUMENTS

| | | | |
|---|---|---|---|
| 6,516,312 | B1 | 2/2003 | Kraft et al. |
| 6,539,348 | B1 | 3/2003 | Bond et al. |
| 6,584,464 | B1 | 6/2003 | Warthen |
| 6,675,159 | B1 | 1/2004 | Lin et al. |
| 6,714,929 | B1 | 3/2004 | Micaelian et al. |
| 6,714,975 | B1 | 3/2004 | Aggarwal et al. |
| 6,757,675 | B2 | 6/2004 | Aiken et al. ............. 707/3 |
| 6,772,150 | B1 | 8/2004 | Whitman et al. |
| 6,826,572 | B2 | 11/2004 | Colace et al. |
| 6,907,566 | B1 | 6/2005 | McElfresh et al. |
| 7,031,932 | B1 | 4/2006 | Lipsky et al. |
| 7,043,483 | B2 | 5/2006 | Colace et al. |
| 7,051,023 | B2 | 5/2006 | Kapur et al. |
| 7,076,463 | B1 | 7/2006 | Boies et al. ............. 705/39 |
| 7,136,853 | B1 | 11/2006 | Kohda et al. |
| 7,216,290 | B2* | 5/2007 | Goldstein et al. ............. 715/234 |
| 7,225,182 | B2 | 5/2007 | Paine et al. |
| 7,231,358 | B2 | 6/2007 | Singh et al. |
| 7,272,597 | B2 | 9/2007 | Chowdhury et al. |
| 7,363,302 | B2 | 4/2008 | Lester |
| 7,523,095 | B2 | 4/2009 | Gates et al. |
| 7,565,630 | B1 | 7/2009 | Kamvar et al. |
| 7,599,938 | B1* | 10/2009 | Harrison, Jr. ............. 707/10 |
| 7,660,734 | B1 | 2/2010 | Neal et al. |
| 7,734,624 | B2* | 6/2010 | Anderson ............. G06Q 30/02 707/727 |
| 7,895,193 | B2* | 2/2011 | Cucerzan et al. ............. 707/721 |
| 8,768,766 | B2* | 7/2014 | Ellis ............. G06Q 30/0242 705/14.43 |
| 8,898,072 | B2* | 11/2014 | Reitz ............. G06Q 30/02 705/14.36 |
| 9,189,794 | B2* | 11/2015 | Dharmaji ............. G06Q 30/02 |
| 2002/0002525 | A1 | 1/2002 | Arai et al. |
| 2002/0169759 | A1 | 11/2002 | Kraft et al. |
| 2003/0046161 | A1 | 3/2003 | Kamangar et al. |
| 2003/0101126 | A1 | 5/2003 | Cheung et al. |
| 2003/0144924 | A1 | 7/2003 | McGee |
| 2003/0149938 | A1 | 8/2003 | McElfresh et al. |
| 2004/0093327 | A1 | 5/2004 | Anderson et al. |
| 2004/0133471 | A1 | 7/2004 | Pisaris-Henderson et al. |
| 2004/0186776 | A1 | 9/2004 | Llach |
| 2004/0267725 | A1 | 12/2004 | Harik |
| 2005/0010477 | A1 | 1/2005 | Sullivan et al. |
| 2005/0021387 | A1 | 1/2005 | Gottfurcht |
| 2005/0027699 | A1* | 2/2005 | Awadallah et al. ............. 707/3 |
| 2005/0076130 | A1* | 4/2005 | Anand et al. ............. 709/228 |
| 2005/0154746 | A1 | 7/2005 | Liu et al. |
| 2005/0180549 | A1 | 8/2005 | Chiu et al. |
| 2005/0189414 | A1 | 9/2005 | Fano et al. |
| 2006/0069614 | A1 | 3/2006 | Agarwal et al. |
| 2006/0117002 | A1 | 6/2006 | Swen |
| 2006/0242017 | A1* | 10/2006 | Libes ............. G06F 17/30864 705/14.54 |
| 2007/0027765 | A1 | 2/2007 | Collins et al. ............. 705/14 |
| 2007/0033531 | A1 | 2/2007 | Marsh |
| 2007/0060129 | A1* | 3/2007 | Ramer et al. ............. 455/439 |
| 2007/0078880 | A1 | 4/2007 | Eiron et al. |
| 2007/0100650 | A1 | 5/2007 | Ramer et al. |
| 2007/0100653 | A1* | 5/2007 | Ramer ............. G06F 17/30749 705/1.1 |
| 2007/0118392 | A1 | 5/2007 | Zinn et al. |
| 2007/0233730 | A1 | 10/2007 | Johnston |
| 2007/0244900 | A1* | 10/2007 | Hopkins ............. G06F 17/30873 |
| 2007/0250468 | A1 | 10/2007 | Pieper |
| 2007/0250492 | A1* | 10/2007 | Angel ............. G06F 17/3097 |
| 2007/0266016 | A1 | 11/2007 | Holmes et al. |
| 2007/0271255 | A1 | 11/2007 | Pappo |
| 2007/0282811 | A1 | 12/2007 | Musgrove |
| 2007/0300142 | A1* | 12/2007 | King ............. G06Q 30/02 382/181 |
| 2008/0040329 | A1 | 2/2008 | Cussen et al. |
| 2008/0065463 | A1 | 3/2008 | Rosenberg et al. |
| 2008/0104061 | A1 | 5/2008 | Rezaei |
| 2008/0114607 | A1 | 5/2008 | Amer-Yahia et al. |
| 2008/0114672 | A1 | 5/2008 | Yahia et al. |
| 2008/0126191 | A1 | 5/2008 | Schiavi |
| 2008/0154858 | A1 | 6/2008 | Manavoglu et al. |
| 2008/0177994 | A1* | 7/2008 | Mayer ............. 713/2 |
| 2008/0215564 | A1 | 9/2008 | Bratseth |
| 2008/0270228 | A1 | 10/2008 | Dasdan |
| 2008/0313164 | A1 | 12/2008 | Lee et al. |
| 2010/0070448 | A1* | 3/2010 | Omoigui ............. 706/47 |
| 2012/0158781 | A1* | 6/2012 | Rhoads et al. ............. 707/770 |

FOREIGN PATENT DOCUMENTS

| | | |
|---|---|---|
| KR | 2001-0094780 A | 11/2001 |
| KR | 10-2003-0066064 | 8/2003 |
| KR | 10-2005-0067239 A | 6/2005 |
| KR | 10-2006-0011336 | 2/2006 |
| KR | 10-2006-0026770 A | 3/2006 |
| WO | WO 01/06403 A2 | 7/2000 |

OTHER PUBLICATIONS

B. Kitts et al. A Trading Agent and Simulator for Keyword Auctions, aamas, pp. 228-235, Third International Joint Conference on Autonomous Agents and Multiagent Systems—vol. 1 (AAMAS'04), 2004, 8 pages.

C. Li et al., RankSQL: Query Algebra and Optimization for Relational Top-k Queries, SIGMOD Conference 2005, 12 pages.

D. Donjerkovic et al., Probabilistic Optimization of Top N Queries, VLDGB Conference 1999, 16 pages.

D. Pisinger, Algorithms for Knapsack Problems, Ph.D Thesis, 1995, 200 pages.

E. Zemel, *An O(n) Algorithm for the Linear Multiple Choice Knapsack Problem and Related Problems,* Information Processing Letters, 1984, 6 pages.

F. Chu et al., *Least Expected Cost Query Optimization: An Exercise in Utility,* PODS Conference 1999, 10 pages.

F. Fabret et al., *Filtering Algorithms and Implementation for Very Fast Publich/Subscribe Systems,* SIGMOD Conference 2001, 12 pages.

G. Aggarwal et al. Truthful Auctions for Pricing Search Keywords, Proceedings of the 7th ACM conference on Electronic commerce, p. 1-7, Jun. 11-15, 2006, Ann Arbor, Michigan, USA, at http://theory.stanford.edu/~gagan/papers/keyword_auctions_EC06.pdf (last visited Jun. 29, 2007), 14 pages.

H. R. Varian, Position auctions. International Journal of Industrial Organization, forthcoming. at http://www.ischool.berkeley.edu/~hal/Papers/2006/position.pdf (last visited Jun. 29, 2007), 21 pages.

H.V. Jagadish et al., *Optimal Histograms with Quality Guarantees,* VLDB Conference 1998, 12 pages.

J. L. Bentley, *Multidimensional Binary Search Trees Used for Associative Searching,* Commun. ACM 18(9): 509-517 (1975), 9 pages.

J. Feng et al., 2006. Implementing Sponsored Search in Web Search Engines: Computational Evaluation of Alternative Mechanisms. INFORMS Journal on Computing, 19 (1), (Jan. 2007) at http://dpennock.com/papers/feng-joc-2005-sponsored-search.pdf (last visited Jun. 29, 2007), 25 pages.

M.J. Carey et al., *On Saying "Enough Already?" in SQL,* SIGMOD Conference 1997, 12 pages.

N. Bruno, et al., *Top-K Selection Queries Over Relational Databases: Mapping Strategies and Performance Evaluation,* ACM Transactions on Database Systems (TODS), 28(2), 2002, 35 pages.

PCT Serial No. PCT/US08/059041, Filed Apr. 1, 2008, Notification of Transmittal of the International Search Report and the Written Opinion of the International Searching Authority, or the Declaration Dated Sep. 8, 2008, 9 pages.

PCT Serial No. PCT/US08/059062, Filed Apr. 1, 2008, Notification of Transmittal of the International Search Report and the Written Opinion of the International Searching Authority, or the Declaration Dated Aug. 18, 2008, 10 pages.

R. Fagin et al., *Optimal aggregation algorithms for middleware,* PODS Conference 2001, 43 pages.

R. Fagin, *Combining fuzzy information from multiple systems,* PODS Conference 1996, 32 pages.

(56) References Cited

OTHER PUBLICATIONS

Stanford Graduate School of Business, "The High Price of Internet Keyword Auctions", at http://www.gsb.stanford.edu/news/research/econ_ostrovsky_internetauction.shtml (last visited Jun. 29, 2007), 3 pages.

U.S. Patent and Trademark Office Action dated Jan. 8, 2009 for U.S. Appl. No. 11/734,294, 10 pages.

U.S. Patent and Trademark Office Action dated Jul. 8, 2009 for U.S. Appl. No. 11/734,294, 12 pages.

U.S. Patent and Trademark Office Action dated Nov. 30, 2009 for U.S. Appl. No. 11/734,294, 17 pages.

U.S. Patent and Trademark Office Action dated May 19, 2009 for U.S. Appl. No. 11/750,512, 9 pages.

U.S. Patent and Trademark Office Action dated Dec. 31, 2009 for U.S. Appl. No. 11/750,512, 13 pages.

U.S. Patent and Trademark Office Action dated Dec. 24, 2008 for U.S. Appl. No. 11/595,585, 12 pages.

U.S. Patent and Trademark Office Action dated Aug. 26, 2009 for U.S. Appl. No. 11/595,585, 15 pages.

U.S. Patent and Trademark Office Action dated Dec. 24, 2009 for U.S. Appl. No. 11/595,585, 19 pages.

U.S. Patent and Trademark Office Action dated Apr. 15, 2010 for U.S. Appl. No. 11/595,585, 23 pages.

U.S. Patent and Trademark Office Action dated Jun. 25, 2009 for U.S. Appl. No. 11/739,242, 11 pages.

U.S. Patent and Trademark Office Action dated Oct. 22, 2009 for U.S. Appl. No. 11/739,242, 14 pages.

U.S. Patent and Trademark Office Action dated Jan. 6, 2010 for U.S. Appl. No. 11/739,242, 7 pages.

U.S. Patent and Trademark Office Action dated Apr. 5, 2010 for U.S. Appl. No. 11/739,242 9 pages.

U.S. Patent and Trademark Office Action dated Mar. 29, 2010 for U.S. Appl. No. 11/734,300, 22 pages.

U.S. Patent and Trademark Office Action dated Oct. 16, 2008 for U.S. Appl. No. 11/644,176, 11 pages.

U.S. Patent and Trademark Office Action dated May 19, 2009 for U.S. Appl. No. 11/644,176, 13 pages.

U.S. Patent and Trademark Office Action dated Sep. 3, 2009 for U.S. Appl. No. 11/644,176, 13 pages.

U.S. Patent and Trademark Office Action dated Apr. 6, 2010 for U.S. Appl. No. 11/644,176, 22 pages.

V. Hristidis et al., *Prefer: A system for the Efficient Execution of Multiparametric Ranked Queries,* SIGMOD Conference 2001, 11 pages.

Y. Diao et al., *Yfilter: Efficient and Scalable Filtering of XML Documents,* ICDE Conference 2002, 2 pages.

Y. Zhou, et al. Vindictive bidding in keyword auctions. In Second Workshop on Sponsored Search Auctions (2006), ACM Electronic Commerce. at http://www.cse.wustl.edu/~yzhou/yunhongzhou/documents/06-ssa-vindictive.pdf (last visited Jun. 29, 2007), 5 pages.

Google Scholar Search dated Mar. 11, 2011; cited by Examiner on Mar. 17, 2011 for U.S. Appl. No. 11/750,512, 3 pages.

U.S. Patent and Trademark Office Action dated Feb. 4, 2011 for U.S. Appl. No. 11/644,176, 14 pages.

U.S. Patent and Trademark Notice of Allowance dated Mar. 17, 2011 for U.S. Appl. No. 11/750,512, 17 pages.

International Preliminary Report on Patentability dated Oct. 13, 2009 for corresponding International Application No. PCT/US2008/059041, 4 pages.

International Preliminary Report on Patentability dated Oct. 13, 2009 for corresponding International Application No. PCT/US2008/059062, 5 pages.

International Preliminary Report on Patentability dated Oct. 27, 2009 for corresponding International Application No. PCT/US2008/059865, 5 pages.

International Search Report and Written Opinion of the International Searching Authority dated Aug. 27, 2008 for corresponding International Application No. PCT/US2008/059865, 6 pages.

U.S. Patent and Trademark Office Action dated Jun. 7, 2010 for U.S. Appl. No. 11/734,294, 16 pages.

U.S. Patent and Trademark Office Action dated Aug. 18, 2010 for U.S. Appl. No. 11/750,512, 11 pages.

U.S. Patent and Trademark Office Action dated Oct. 14, 2010 for U.S. Appl. No. 11/734,300, 22 pages.

\* cited by examiner

SYSTEM FOR SERVING DATA THAT MATCHES CONTENT RELATED TO A SEARCH RESULTS PAGE

TECHNICAL FIELD

The present description relates generally to a system and method, generally referred to as a system, for serving data that matches content related to a search results page.

BACKGROUND

Online advertising may be an important source of revenue for enterprises engaged in electronic commerce. A number of different kinds of page-based online advertisements are currently in use, along with various associated distribution requirements, advertising metrics, and pricing mechanisms. Processes associated with technologies such as Hypertext Markup Language (HTML) and Hypertext Transfer Protocol (HTTP) may enable a page to be configured to contain a location for inclusion of an advertisement. An advertisement may be selected for display each time the page is requested, for example, by a browser or server application.

Some search engine marketing systems may allow an advertiser to place a bid on a keyword or query. If a web surfer searches for the search term the advertiser bid on, the advertiser's advertisement may be displayed to the web surfer. The advertiser may pay a fee to the search engine marketing system provider when the web surfer clicks through on the advertisement. Thus, the search engine marketing system provider and the advertiser may benefit from ensuring all of the advertisement slots on a search results page are filled with relevant advertisements. The more relevant advertisements displayed to the web surfers, the greater the likelihood may be that a web surfer may click through to an advertiser's site, resulting in a lead for the advertiser and revenue for the search engine marketing system provider.

This may be a viable mechanism for concept-based advertising; however it may only allow an advertiser to target web surfers based on a keyword or a query. This may require advertisers to predict keywords or queries that may be searched for by web surfers. If a web surfer searches for a keyword or query which has not been bid on by any advertisers, the search engine marketing system may not display any advertisements to the web surfer. If a search results page is displayed with no advertisements, there may be little likelihood of leads for the advertisers and revenue for the search engine marketing system provider.

SUMMARY

A system for serving data that matches content related to a search results page may include a processor, an interface and a memory. The memory may be operatively connected to the processor, and the interface, and may store a search results page, content related to the search results page, a set of terms and data. The interface may be operatively connected to the memory and the processor and may communicate with the users. The processor may identify the search results page, and the content related to the search results page. The processor may process the content to generate a set of search terms. The processor may match the set of search terms to the data and add the data to the page. The processor may then serve the page to the user via the interface.

Other systems, methods, features and advantages will be, or will become, apparent to one with skill in the art upon examination of the following figures and detailed description.

It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

A system and method, generally referred to as a system, relate to serving or displaying data that matches content related to a search results page, and more particularly, but not exclusively, to supplementing advertisements, such as sponsored listings, served in a search engine marketing system by serving advertisements matched to content, user behavior, and/or any other data capable of being matched to an advertisement. The advertisements may be served in addition to serving advertisements targeted to search keywords.

The system and method, generally referred to as a system, may relate to serving or displaying data that matches the content of the search results page. The data may be advertisements or any other data. The data may be matched to content, user behavior and/or any other data capable of being matched to an advertisement. The data may be served is in addition to serving advertisements targeted to search keywords.

The principles described herein may be embodied in many different forms. A service provider, such as a search engine marketing system provider, may serve data for a search results page matched to content, user behavior, or other data capable of being matched to data. The data may be served exclusively or may be served as supplemental to data targeting the keyword or query searched for.

The data, such as an advertisement, may be matched to several types of content, including the content of the search results page itself, the content of the title and description of the first five search results, the content of the user's query or search keyword, any suggested search queries or keywords, or generally any content capable of being matched to data. Furthermore, the data may be matched to historical user data describing the behavior of the current user. The historical user data may include other queries performed by the user in the same session, the behavior of the user on other properties of the service provider, or generally any user behavior data that is capable of being matched to a data. The data may also be matched based on the historical behavior of other users, such as the most popular searches and queries of other users, and the historical behavior of other users at the same time of day as the current user. One or more of these methods of matching may be combined to further refine the match.

Figure 1:
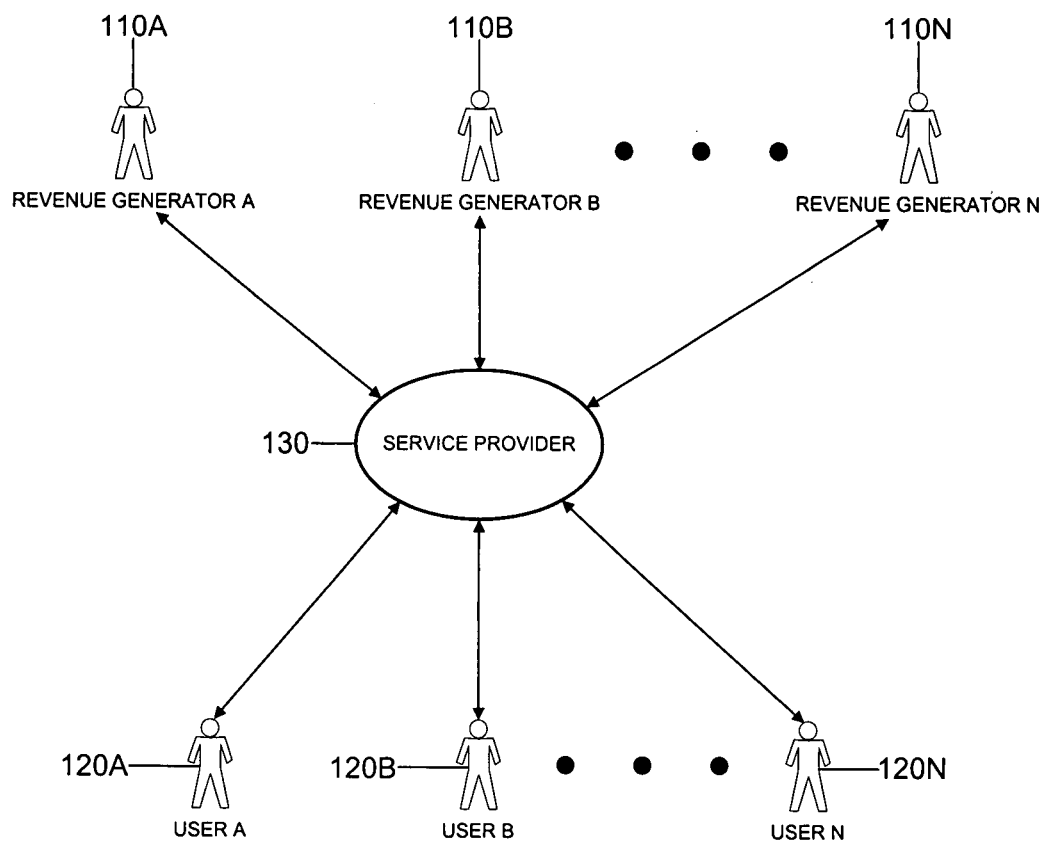
FIG. 1 is a block diagram of a general overview of a system for serving data that matches content related to a search results page.

FIG. 1 provides a general overview of a system 100 for serving data that matches content relating to a search results page. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more revenue generators 110A-N, such as advertisers, a service provider 130, such as a search engine marketing service provider, and one or more users 120A-N, such as web surfers or consumers. The service provider 130 may implement an advertising campaign management system incorporating an auction based and/or non-auction based advertisement serving system. The revenue generators 110A-N may pay the service provider 130 to serve, or display, advertisements of their goods or services, such as on-line advertisements, on a network, such as the Internet. The payments may be based on various factors, such as the number of times an advertisement may be displayed to the users 120A-N and/or the number of times one of the users 120A-N clicks through the advertisement to the revenue generator's web site. The advertisements may include sponsored listings, banners ads, popup advertisements, or generally any way of attracting the users 120A-N to the web site of the revenue generators 110A-N.

The users 120A-N may be consumers of goods or services who may be searching for a business such as the business of one of the revenue generators 110A-N. Alternatively or in addition the users 120A-N may be machines or other servers, such as the third party server 250. The users 120A-N may supply information describing themselves to the service provider 130, such as the location, gender, or age of the users 120A-N, or generally any information that may be required for the users 120A-N to utilize the services provided by the service provider 130.

In the system 100, the revenue generators 110A-N may interact with the service provider 130, such as via a web application. The revenue generators 110A-N may send information, such as billing, website and advertisement information, to the service provider 130 via the web application. The web application may include a web browser or other application such as any application capable of displaying web content. The application may be implemented with a processor such as a personal computer, personal digital assistant, mobile phone, or any other machine capable of implementing a web application.

The users 120A-N may also interact individually with the service provider 130, such as via a web application. The users 120A-N may interact with the service provider 130 via a web based application or a standalone application. The service provider 130 may communicate data to the revenue generators 110A-N and the users 120A-N over a network. The following examples may refer to a revenue generator A 110A as an online advertiser; however the system 100 may apply to any revenue generators 110A-N who may utilize advertising creatives.

In operation, one of the revenue generators 110A-N, such as revenue generator A 110A, may provide information to the service provider 130. This information may relate to the transaction taking place between the revenue generator A 110A and the service provider 130, or may relate to an account the revenue A 110A generator maintains with the service provider 130. In the case of a revenue generator A 110A who is an online advertiser, the revenue generator A 110A may provide initial information necessary to open an account with the service provider 130.

The revenue generators 110A-N may implement several advertising tactics with the service provider 130 to target advertisements to the users 120A-N. One example of an advertising tactic may be sponsored search, such as targeting advertisements to search terms or keywords. Sponsored search may operate within the context of an auction-based system or marketplace that may be used by the revenue generators 110A-N to bid for search terms or groups of terms. When the terms are used in a search, the ad listings or links of a revenue generator, such as the revenue generator A 110A, may be displayed among the search results. Revenue generators 110A-N may further bid for position or prominence of their listings in the search results. With regard to auction-based sponsored search, the revenue generator A 110A may provide a uniform resource locator (URL) for the webpage to which the ad may take the users 120A-N to if clicked on. The revenue generator A 110A may also provide the text or creative of the advertisement that may be displayed in connection with the URL. A revenue generator A 110A may identify one or more terms that may be associated with the advertisement.

Another example of an advertising tactic may be content matching. Content match advertisements may be used by the revenue generator A 110A to complement, or as alternative to, the sponsored search tactic. Ads stored according to the content match tactic may be displayed alongside relevant articles, product reviews, etc, presented to the users 120A-N. The system 100 may implement a content matching system. The content matching system may process the words on a given page to determine a set of terms. The set of terms may be the most commonly occurring words, or may be determined by some other factor. The set of terms may then be used to determine which of the content match advertisements to display. The content matching system may use the set of terms to select advertisements, such as by selecting the advertisements which contain the most number of words matching the set of terms.

Content match advertisements may be displayed on any web page containing content relevant to the advertisement. For the content match tactic, the revenue generator A 110A may provide one or more URLs identifying the address of a webpage a given ad may take the users 120A-N to if clicked on. The revenue generator A 110A may also provide the text, image, video or other type of multimedia comprising the creative portion of the advertisement that may be displayed next to the URL.

Yet another example of an advertising tactic may be a banner advertisement or popup advertisement. The banner ad and/or popup ad tactic may be used by the revenue generators 110A-N to complement, or as alternative to, the sponsored search tactic and the content match tactic. In contrast to the sponsored search tactic and content match tactic, which may be based on a pay-per-click payment scheme, a revenue generator 110A-N may pay for every display of a banner ad and/or popup ad, referred to as an impression. Alternatively, if the banner ad and/or popup ad displays a phone number, a revenue generator, such as the revenue generator A 110A may only be billed if a user, such as the user A 120A, calls the phone number associated with the advertisement ("pay-per-call"). Thus, for the banner ad and/or popup ad tactic, the revenue generator A 110A may provider a URL to the webpage where the ad may take the user A 120A if clicked on, as well as the creative or the given banner ad and/or popup ad.

A revenue generator A 110A who is an online advertiser may maintain several accounts with the service provider 130. For each account the revenue generator A 110A may maintain several advertising campaigns, such as an MP3 player campaign, a car campaign, or any other distinguishable category of products and/or services. Each campaign may include one or more ad groups. The ad groups may further distinguish the category of products and/or services represented in the advertising campaign, such as by search tactic, performance parameter, demographic of user, family of products, or almost any other parameter desired by the revenue generators 110A-N.

For example, if the advertising campaign is for MP3 Players, there may be an ad group each brand of MP3 players, such as APPLE IPOD or MICROSOFT ZUNE. Allowing the revenue generators 110A-N to determine their own ad groups may allow the service provider 130 to provide more useful information to the revenue generators 110A-N. The revenue generators 110A-N may thereby display, manage, optimize, or view reports on, advertisement campaign information in a manner most relevant to a revenue generator, such as the revenue generator A 110A.

The ad groups may include one or more listings. A listing may include a title, a description, one or more search keywords, an advertisement, a destination URL, and a bid amount. A listing may represent an association between the one or more search keywords identified by the revenue generator A 110A, and an advertisement of the revenue generator A 110A.

The title may be the name of the product being advertised, such as "JEEP WRANGLER." The description may describe the product being advertised. For example, if GENERAL MOTORS wished to advertise a GENERAL MOTORS JEEP WRANGLER, the listing may have a description of "GENERAL MOTORS JEEP WRANGLER," "JEEP WRANGLER," or "5 PASSENGER JEEP WRANGLER."

The destination URL may represent the link the revenue generator A 110A wishes a user A 120A to be directed to upon clicking on the advertisement of the revenue generator A 110A, such as the home page of the revenue generator A 110A. The bid amount may represent a maximum amount the revenue generator A 110A may be willing to pay each time a user A 120A may click on the advertisement of the revenue generator A 110A or each time the advertisement of the revenue generator A 110A may be shown to a user A 120A.

The keywords may represent one or more search terms that the revenue generator A 110A wishes to associate their advertisement with. When a user A 120A searches for one of the listing's keywords, the advertisement of the revenue generator A 110A may be displayed on the search results page. For example, a revenue generator A 110A, such as GENERAL MOTORS, may desire to target an online advertisement for a GENERAL MOTORS JEEP WRANGLER to users 120A-N searching for the keywords "JEEP", "WRANGLER", or "JEEP WRANGLER". GENERAL MOTORS may place a bid with the service provider 130 for the search keywords "JEEP", "WRANGLER", and "JEEP WRANGLER" and may associate the online advertisement for a GENERAL MOTORS JEEP WRANGLER with the keywords. The advertisement of the revenue generator A 110A may be displayed when one of the users 120A-N searches for the keywords "JEEP", "WRANGLER", or "JEEP WRANGLER".

An advertisement may represent the data the revenue generator A 110A wishes to be displayed to a user A 120A when the user A 120A searches for one of the listing's keywords. An advertisement may include a combination of the description and the title. The ad groups may each contain several different advertisements, which may be referred to as creatives. Each of the individual advertisements in an ad group may be associated with the same keywords. The advertisements may differ slightly in creative aspects or may be targeted to different demographics of the users 120A-N.

There may be some instances where multiple revenue generators 110A-N may have bid on the same search keyword. The service provider 130 may serve to the users 120A-N the online advertisements that the users 120A-N may be most likely to click on. For example, the service provider 130 may include a relevancy assessment to determine the relevancy of the multiple online advertisements to the search keyword. The more relevant an advertisement may be to the keyword the more likely it may be that the user A 120A may click on the advertisement. The relevancy may be determined by the service provider 130 or a third party relevancy engine.

When one of the users 120A-N, such as the user A 120A, interacts with the service provider 130, such as by searching for a keyword, the service provider 130 may retain data describing the interaction with the user A 120A. The saved data may include the keyword searched for, the geographic location of the user A 120A, and the date/time the user A 120A interacted with the service provider 130. The data may also generally include any data available to the service provider 130 that may assist in describing the interaction with the user A 120A, or describing the user A 120A. The service provider 130 may also store data that indicates whether an advertisement of one of the revenue generators 110A-N, such as the revenue generator A 110A was displayed to the user A 120A, and whether the user A 120A clicked on the advertisement.

The users 120A-N may supply information relating to their geographic location and/or other descriptive information upon their initial interaction with the service provider 130. Alternatively or in addition the service provider 130 may obtain the location of the user A 120A based on the IP address of the user A 120A. The service provider 130 may use a current date/time stamp to store the date/time when the user A 120A interacted with the service provider 130.

The service provider 130 may generate reports based on the data collected from the user interactions and communicate the reports to the revenue generators 110A-N to assist the revenue generators 110A-N in measuring the effectiveness of their online advertising. The reports may indicate the number of times the users 120A-N searched for the keywords bid on by the revenue generators 110A-N, the number of times each advertisement of the ad groups of the revenue generators 110A-N was displayed to the users 120A-N, the number of times the users 120A-N clicked through on each advertisement of the ad groups of the revenue generators 110A-N. The reports may also generally indicate any data that may assist the revenue generators 110A-N in measuring or managing the effectiveness of their online advertising.

The reports may further include sub-reports that segment the data into more specific categories, including the time intervals when the interactions occurred, such as weeknights primetime, weekends, etc., the demographics of the users 120A-N, such as men ages 18-34, the location of the users 120A-N. The reports may also generally include any other data categorization that may assist the revenue generators 110A-N in determining the effectiveness of their online advertising.

More detail regarding the aspects of auction-based systems, as well as the structure, function and operation of the service provider 130, as mentioned above, can be found in commonly owned U.S. patent application Ser. No. 10/625,082, filed on Jul. 22, 2003, entitled, "TERM-BASED CONCEPT MARKET"; U.S. patent application Ser. No. 10/625,000, file on Jul. 22, 2003, entitled, "CONCEPT VALUATION IN A TERM-BASED CONCEPT MARKET" filed on Jul. 22, 2003; U.S. patent application Ser. No. 10/625,001, filed on Jul. 22, 2003, entitled, "TERM-BASED CONCEPT INSTRUMENTS"; and U.S. patent application Ser. No. 11/489,386, filed on Jul. 18, 2006, entitled, "ARCHITECTURE FOR AN ADVERTISEMENT DELIVERY SYSTEM," all of which are hereby incorporated herein by reference in their entirety. The systems and methods herein associated with ad campaign management may be practiced in combination with methods and systems described in the above-identified patent applications incorporated by reference.

Figure 2:
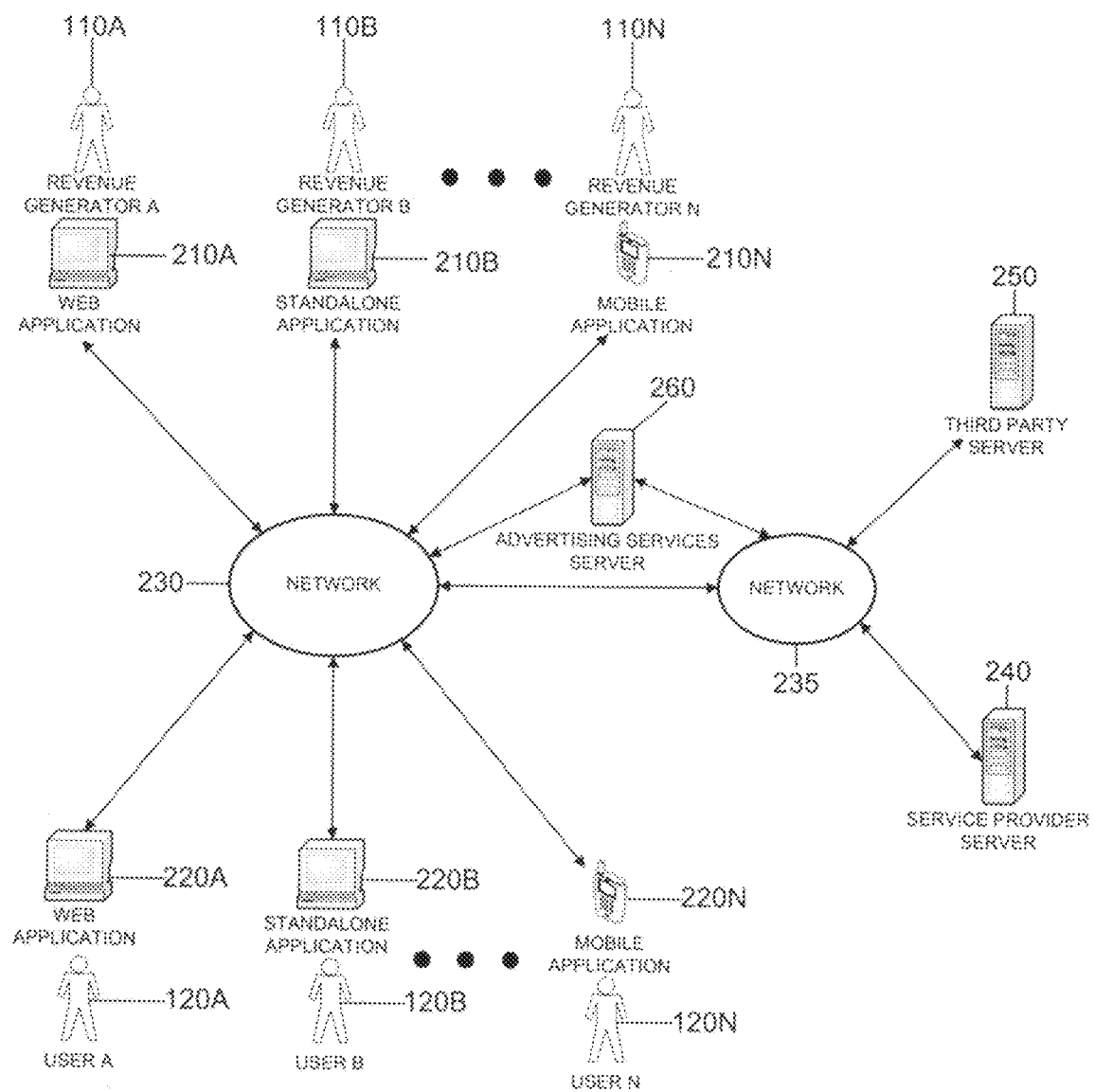
FIG. 2 is block diagram of a simplified view of a network environment implementing the system of FIG. 1 or other systems for serving data that matches content related to a search results page.

FIG. 2 provides a simplified view of a network environment 200 implementing the system of FIG. 1 or other systems for serving data that matches content related to a search results page. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more web applications, standalone applications and mobile applications 210A-N, which may be collectively or individually referred to as client applications for the revenue generators 110A-N. The system 200 may also include one or more web applications, standalone applications, mobile applications 220A-N, which may collectively be referred to as client applications for the users 120A-N, or individually as a user client application. The system 200 may also include a network 230, a network 235, the service provider server 240, a third party server 250, and an advertising services server 260.

Some or all of the advertisement services server 260, service provider server 240, and third-party server 250 may be in communication with each other by way of network 235. The advertisement services server 260, third-party server 250 and service provider server 240 may each represent multiple linked computing devices. Multiple distinct third party servers, such as the third-party server 250, may be included in the network environment 200. A portion or all of the advertisement services server 260 and/or the third-party server 250 may be a part of the service provider server 240.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The revenue generators 110A-N may use a web application 210A, standalone application 210B, or a mobile application 210N, or any combination thereof, to communicate to the service provider server 240, such as via the networks 230, 235. Similarly, the users 120A-N may use a web application 220A, a standalone application 220B, or a mobile application 220N to communicate to the service provider server 240, via the networks 230, 235.

The service provider server 240 may communicate to the revenue generators 110A-N via the networks 230, 235, through the web applications, standalone applications or mobile applications 210A-N. The service provider server 240 may also communicate to the users 120A-N via the networks 230, 235, through the web applications, standalone applications or mobile applications 220A-N.

The web applications, standalone applications and mobile applications 210A-N, 220A-N may be connected to the network 230 in any configuration that supports data transfer. This may include a data connection to the network 230 that may be wired or wireless. Any of the web applications, standalone applications and mobile applications 210A-N, 220A-N may individually be referred to as a client application. The web applications 210A, 220A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B, 220B may run on a machine that may have a processor, memory, a display, a user interface and a communication interface. The processor may be operatively connected to the memory, display and the interfaces and may perform tasks at the request of the standalone applications 210B, 220B or the underlying operating system. The memory may be capable of storing data. The display may be operatively connected to the memory and the processor and may be capable of displaying information to the revenue generator B 110B or the user B 120B. The user interface may be operatively connected to the memory, the processor, and the display and may be capable of interacting with a user A 120A or a revenue generator A 110A. The communication interface may be operatively connected to the memory, and the processor, and may be capable of communicating through the networks 230, 235 with the service provider server 240, third party server 250 and advertising services server 260. The standalone applications 210B, 220B may be programmed in any programming language that supports communication protocols. These languages may include: SUN JAVA, C++, C#, ASP, SUN JAVASCRIPT, asynchronous SUN JAVASCRIPT, or ADOBE FLASH ACTIONSCRIPT, amongst others.

The mobile applications 210N, 220N may run on any mobile device that may have a data connection. The data connection may be a cellular connection, a wireless data connection, an internet connection, an infra-red connection, a Bluetooth connection, or any other connection capable of transmitting data.

The service provider server 240 may include one or more of the following: an application server, a data source, such as a database server, a middleware server, and an advertising services server. The service provider server 240 may co-exist on one machine or may be running in a distributed configuration on one or more machines. The service provider server 240 may collectively be referred to as the server. The service provider may implement a search engine marketing system and/or an advertising campaign management system. The service provider server 240 may receive requests from the users 120A-N and the revenue generators 110A-N and may serve pages to the users 120A-N and the revenue generators 110A-N based on their requests.

The third party server 250 may include one or more of the following: an application server, a data source, such as a database server, a middleware server, and an advertising services server. The third party server may implement a relevancy engine, a context matching engine, or any other third party application that may be used in a search engine marketing system and/or an advertising campaign management system. The third party server 250 may co-exist on one machine or may be running in a distributed configuration on one or more machines. The third party server 250 may receive requests from the users 120A-N and the revenue generators 110A-N and may serve pages to the users 120A-N and the revenue generators 110A-N based on their requests.

The advertising services server 260 may provide a platform for the inclusion of advertisements in pages, such as web pages. The advertisement services server 260 may be used for providing advertisements that may be displayed to the users 120A-N. The advertising services server 260 may implement a search engine marketing system and/or an advertising campaign management system.

Figure 9:
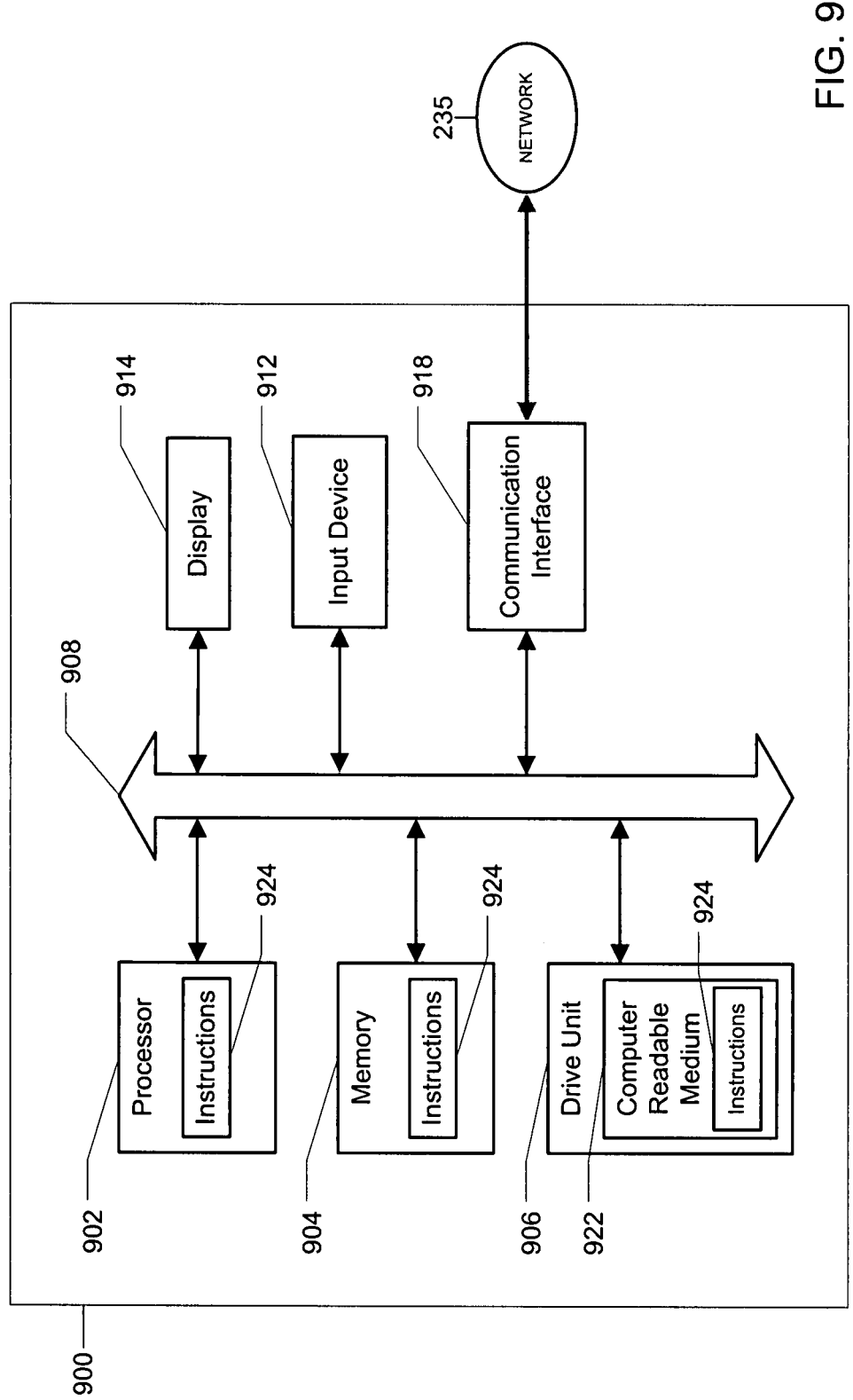
FIG. 9 is an illustration a general computer system that may be used in the system of FIG. 1 or other systems for serving data that matches content related to a search results page.

The service provider server 240, the third party server 250 and the advertising services server 260 may be one or more computing devices of various kinds, such as the computing device in FIG. 9. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web applications 210A, 210A may employ HTTP to request information, such as a web page, from a web server, which may be a process executing on the service provider server 240 or the third-party server 250.

There may be several configurations of database servers, application servers, middleware servers and advertising services servers included in the service provider server 240 or the third party server 250. Database servers may include MICROSOFT SQL SERVER, ORACLE, IBM DB2 or any other database software, relational or otherwise. The application server may be APACHE TOMCAT, MICROSOFT IIS, ADOBE COLDFUSION, YAPACHE or any other application server that supports communication protocols. The middleware server may be any middleware that connects software components or applications. The middleware server may be a relevancy engine, a context matching engine, or any other middleware that may be used in a search engine marketing system and/or an advertising campaign management system.

The application server on the service provider server 240 or the third party server 250 may serve pages, such as web pages to the users 120A-N and the revenue generators 110A-N. The advertising services server may provide a platform for the inclusion of advertisements in pages, such as web pages. The advertising services server 260 may also exist independent of the service provider server 240 and the third party server 250. The advertisement services server 260 may be used for providing advertisements that may be displayed to users 120A-N on pages, such as web pages.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
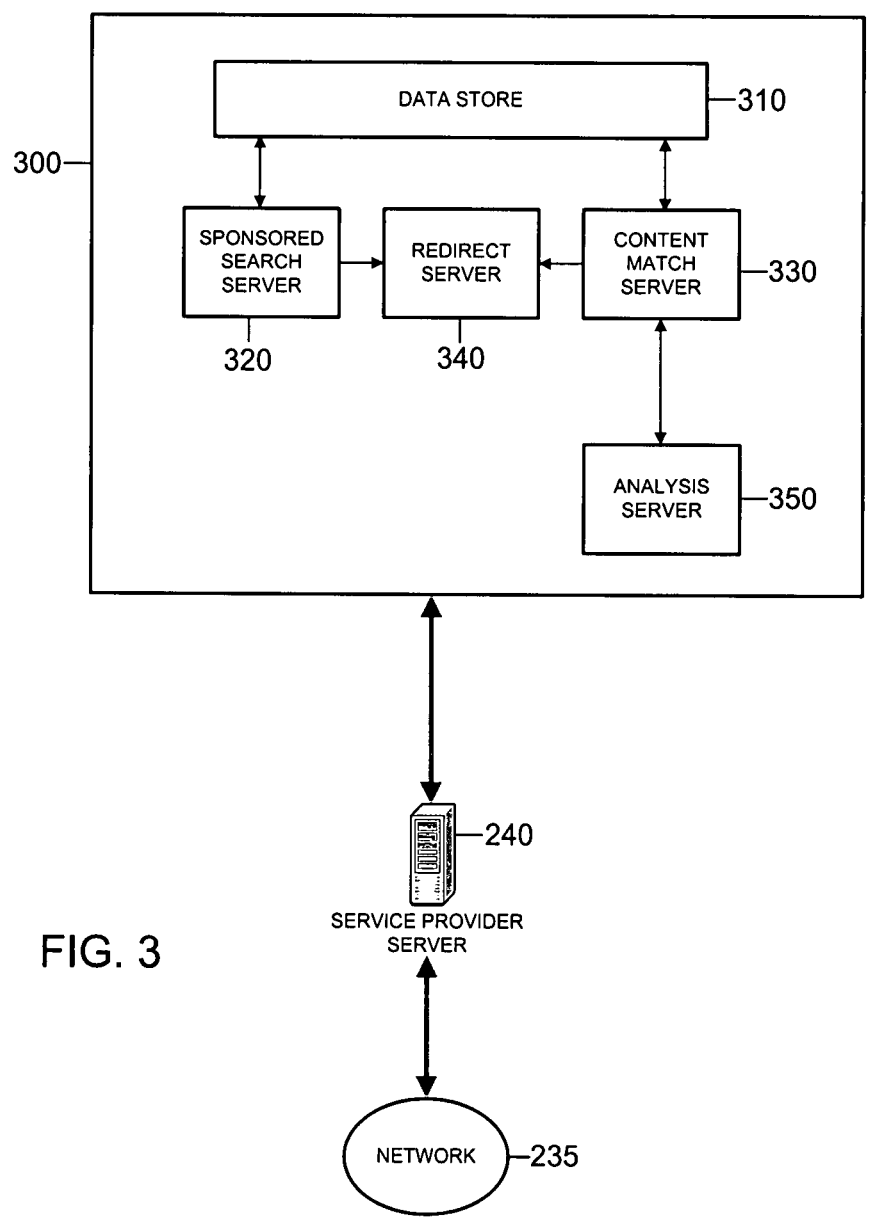
FIG. 3 is a block diagram illustrating a data serving system implementing the system of FIG. 1 or other systems for serving data that matches content related to a search results page.

FIG. 3 illustrates a data serving system 300 implementing a system for serving data, such as advertisements, that matches content related to a search results page. The data serving system 300 may be implemented by the service provider server 240 or the ad services server 260. The data serving system 300 may be an ad serving system, such as an auction-based ad serving system. The data serving system 300 may include a data store 310, a sponsored search server 320, a content match server 330, a redirect server 340, and an analysis server 350. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The data store 310 may be operative to store data, such as advertisement listings. The data store 310 may include one or more relational databases or other data stores that may be managed using various known database management techniques, such as, for example, SQL and object-based techniques. Alternatively or in addition the data store 310 may be implemented using one or more of the magnetic, optical, solid state or tape drives.

The sponsored search server 320 may be operative to process sponsored search listing requests from the client applications 210A-N. When a request for a sponsored search listing comes from service provider server 240, the sponsored search server 320 may query the data store 310 for any data, such as advertisements, matching the specified search terms. If matching data, such as ad listings, are available in the data store 310, the sponsored search server 320 may return the retrieved data to the service provider server 240. The service provider server 240 may then serve the data, such as sponsored listings, to the client applications 210A-N. In the case of advertisement data, the advertisements may be displayed in descending order based on a metric for the given search terms, such as the bid value, or effective cost per mile (eCPM), whereby matching ads with the highest values are displayed first followed by the lower valued advertisements. The effective cost per mille (eCPM) may refer to the cost per thousand views, or impressions, of an advertisement.

The content match server 330 may operate in a similar manner. The content match server 330 may be operative to process content match listing requests from the service provider server 240. When a request for a content match listing comes from the service provider server 240, the content match server 330 may query the data store 310 for data, such as advertisements, matching the specified search terms. If matching data, such as ad listings, are available in the data store 310, the content match server 330 may return the data the service provider server 240. The service provider server 240 may then serve the data, such as advertisements, to the client applications 210A-N. In the case of advertisement data, the advertisements may be displayed in the order based on the relevancy of the received advertisements to the search terms. The relevancy may be determined by a relevancy engine implemented on the service provider server 240 or the third party server 250.

The analysis server 350 may include a semantic analysis component and a cookie analysis component. The semantic analysis component may be operative to process content, such as through a semantic analysis, a latent semantic analysis, a probabilistic latent semantic analysis, a Latent Dirichlet allocation, a principal components analysis, a factors analysis, a conceptual analysis, a relational analysis, or generally any analysis capable of extracting a set of terms from the content. The service provider server 240 may submit content, such as data from a search results page, for analysis. The content may include all or part of a search results page in a search engine marketing system, such as the title and description of the first five results on the search results page. The content may include all or part of the search query used to generate the search results page, any similar queries suggested by the service provider server 240. The content may include all or some of the anchor texts and other meta-data that may be associated with the search results. The content may include all or some of the URLs associated with the search results. The content may include all or some of the content of the landing pages represented by the URLs.

The analysis server 350 may process the content. In the case of a semantic analysis, the processing may include the process of relating syntactic structures, from the levels of phrases, clauses, sentences, and paragraphs to the level of the writing as a whole, to their language-independent meanings, removing features specific to particular linguistic and cultural contexts. The elements of idiom and figurative speech, being cultural, may also be converted into relatively invariant meanings. A semantic analysis may be performed by any standard analysis server, which may be implemented by the service provider server 240 or the third party server 250.

More detail regarding the aspects of semantic analysis, as well as the structure, function and operation of the analysis server 350, as mentioned above, can be found in commonly owned U.S. patent application Ser. No. 10/625,082, filed on Jul. 22, 2003, entitled, "TERM-BASED CONCEPT MARKET"; U.S. patent application Ser. No. 11/295,166, filed on Dec. 5, 2005, entitled "SYSTEMS AND METHODS FOR MANAGING AND USING MULTIPLE CONCEPT NETWORKS FOR ASSISTED SEARCH PROCESSING"; U.S. patent application Ser. No. 10/797,586, filed on Mar. 9, 2004, entitled "VECTOR ANALYSIS OF HISTOGRAMS FOR UNITS OF A CONCEPT NETWORK IN SEARCH QUERY PROCESSING"; U.S. patent application Ser. No. 10/797,614, filed on Mar. 9, 2004, entitled "SYSTEMS AND METHODS FOR SEARCH PROCESSING USING SUPERUNITS"; and U.S. Pat. No. 7,051,023, filed on Nov. 12, 2003, entitled "SYSTEMS AND METHODS FOR GENERATING CONCEPT UNITS FROM SEARCH QUERIES," all of which are hereby incorporated herein by reference in their entirety. The systems and methods herein associated with semantic analysis may be practiced in combination with methods and systems described in the above-identified patent applications incorporated by reference.

The cookie analysis component of the analysis server 350 may be operative to process a user cookie, such as an HTTP cookie or a web cookie. The cookie may include data, or content, describing the behavior of one of the users 120A-N, such as the user A 120A. The data may include all or some of the data describing the historical behavior of the user, such as the user A 120A, on the properties of the service provider 130. The data may also include the historical behavior of the other users 120B-N on the properties of the service provider 130, and the historical behavior of the other the users 120B-N interacting with the service provider 130 at a similar time of day as the user A 120A. The cookie analysis component may be operative to extract keywords from the data, or content, of the cookie. The keywords may describe the behavior of the user A 120A.

The content analysis component or the cookie analysis component of the analysis server 350 may return a set of keywords. The set of keywords may then be submitted to the content match server 330. The content match server 330 may query the data store 310 for data, such as advertisements, matching the specified keywords. If matching data, such as ad listings, are available in the data store 310, the content match server 330 may return the data to the service provider server 240. The service provider server 240 may then serve the data, such as advertisements to the client applications 210A-N. In the case of advertisement data, the advertisements may be displayed in the order based on the relevancy of the received advertisements to the search terms. The relevancy may be determined by a relevancy engine implemented on the service provider server 240 or the third party server 250.

The service provider 130 may serve data, such as advertisements, displayed on a search results page retrieved from any combination of the sponsored search server 320, the content match server 330, or the analysis server 350 paired with the content match server 330. Alternatively or in addition the service provider 130 may serve data, such as advertisements, displayed on a search results page retrieved from the analysis server 350 paired with the content match server 330 any time the sponsored search server 320 does not return any advertisements, or does not return enough advertisements to fill all data space, such as advertising space, on the search results page.

When a user 120A-N clicks on linked data, such as an advertisement, provided by the one of the client applications 210A-N, the browser of a user, such as the user A 120A, may be directed to the redirect server 340 of the data serving system 300. The redirect server 340 may log the click event and redirect the browser of the user A 120A to the URL of the web property specified in the displayed data, such as advertisements. The redirect server 340 may store the click event in the data store 310, or in any other data store, for ad performance evaluation purposes.

Figure 4:
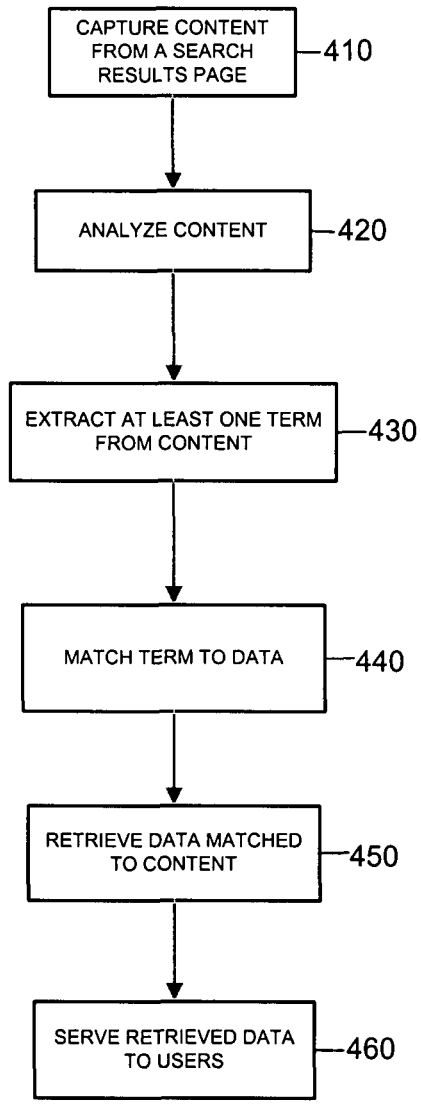
FIG. 4 is a flowchart illustrating the operations of the systems of FIG. 1, or other systems for serving data that matches content related to a search results page.

FIG. 4 is a flow chart illustrating the operations of the system of FIG. 1, or other systems for serving data that matches content related to a search results page. At block 410 the service provider server 240 may extract content from a search results page in search engine marketing system, such as by copying the content to a local data store. The content may include all or part of the search results displayed on the search results page, or may include the query used to generate the search results page or any query suggested by the service provider 130. The content may include data describing the current user, such as the user A 120A. The data describing the user may include previous queries performed by the user within the same session, or previous interactions of the user with other services provided by the service provider 130. If the user A 120A has registered with the service provider 130, other historical data may be used. The content may further include data describing the behavior of other users 120B-N. The data may describe other users 120B-N with similar interests as the user A 120A or with similar demographics as the user A 120A. The data may also describe the behavior of other users 120B-N at the same time of day, day of the week, or any other distinct date/time, that the user A 120A may be interacting with the service provider 130. Alternatively or in addition to the user related content may be extracted from a user cookie.

At block 420 the service provider 130 may process the content, such as through a semantic analysis. The content may be analyzed by the analysis server 350. For example, the analysis server 350 may determine which terms or set of terms appear most often in the content. At block 430, the analysis server 350 may extract at least one term from the content through the processing. The term or set of terms may be the terms which appear most often in the content. The term or set of terms may generally describe or relate to the content submitted to the analysis server 350.

At block 440 the service provider 130 may match the term or set of terms retrieved from the analysis server 350 with the data, such as advertisements. The matching may be performed by the content match server 330. The content match server 330 may search the data store 310, for any matching data, such as advertisements with a title or description containing the term or set of terms retrieved from the analysis server 350. The content match server 330 may order the data based on which data matches the most number of terms.

At block 450 the service provider server 240 may retrieve the data, such as advertisements, matching the content from the content match server. At block 460 the service provider server 240 may serve the data to the users 120A-N via the client applications 210A-N. The service provider server 240 may serve the data to the users 120A-N individually or in conjunction with data, such as advertisements, retrieved from the sponsored search server 320.

The service provider server 240 may first attempt to retrieve data, such as advertisements, from the sponsored search server 320. If the sponsored search server 320 does not return any data, such as advertisements, or does not return enough data to fill all of the data space on the page, such as ad slots, the service provider server 240 may then attempt to retrieve data, such as advertisements, in accordance with the operations of FIG. 4. The service provider server 240 may submit all of the data, such as advertisements, to a relevancy engine to determine what order to display the data in. Alternatively or in addition if the sponsored search server 320 does not return any results or does not return enough results to fill all of the data space, such as ad slots, on the page, the service provider server 240 may retrieve relevant data, such as advertising data, in any other manner to fill the data space on the page.

Figure 5:
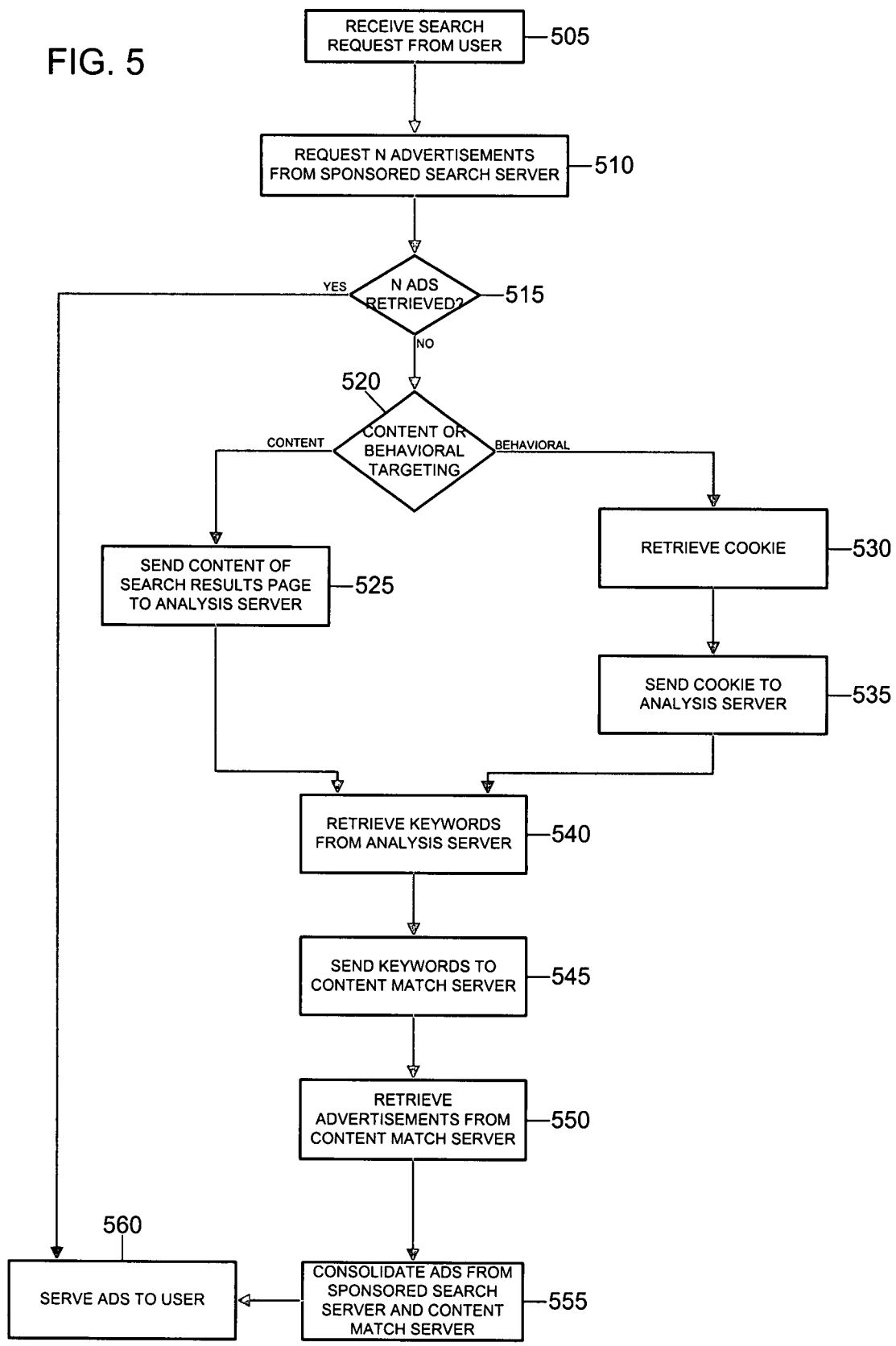
FIG. 5 is a flowchart illustrating the operations of the a search engine marketing system implementing the system of FIG. 1, or other systems for serving data that matches content related to a search results page.

FIG. 5 illustrates the operations of the a search engine marketing system implementing the system of FIG. 1, or other systems for serving data that matches content related to a search results page. In this instance the service provider server 240 may implement a search engine marketing system. At block 505 the service provider server 240 may receive a search request from one of the users 120A-N, such as the user A 120A. The search request may include a term or set of terms that the user A 120A may desire information on. The service provider server 240 may retrieve the information the user A 120A may be searching for and may add the information to a search results page.

At block 510 the service provider server 240 may request N advertisements from the sponsored search server 320, where N may be any number such as, 0, 1, 2, 3, etc. At block 515 the service provider server 240 may determine whether the sponsored search server 320 returned the number of ads requested, N. If the sponsored search server 320 returned N ads, then the system 100 may proceed to block 560. At block 560 the service provider server 240 may add the advertisements to the search results page and serve the advertisements and/or search results to the user A 120A, such as via the network 230.

If the sponsored search server 320 returns less than N ads, the system 100 may move to block 520. At block 520 the service provider server 240 may determine whether the targeting of the user A 120A may be content based or behavioral based. Content based targeting may target the content of the search results page, while behavioral targeting may target based on the historical behavior of the users 120A-N. If the targeting is content based, the system 100 may move to block 525. At block 525 the service provider server 240 may send the content of the search results page to the analysis server 350. The analysis server 350 may analyze the content and extract keywords from the content per the operations of FIG. 4. The system 100 may then move to block 540.

If the targeting is behavioral targeting the system 100 may move to block 530. At block 530 the service provider server 240 may retrieve a cookie relating to the user A 120A. The cookie may be any data that may describe the historical online behavior of the user A 120A, such as links the user A 120A clicked on, searches performed by the user A 120A, etc. At block 535 the service provider server 240 may send the cookie to the analysis server 350. The analysis server may analyze the cookie to extract keywords relating to the behavior of the user A 120A. The analysis server 350 may extract the keywords in the same manner that keywords are extracted from content in FIG. 4. The system 100 may then move to block 540.

At block 540 the service provider server 240 may retrieve the extracted keywords from the analysis server 350. At block 545 the service provider server 240 may send the keywords to the content match server 330. The content match server 330 may retrieve advertisements from the data store 310 that may relate to the keywords. At block 550 the service provider server 240 may retrieve the advertisements from the content match server 330.

At block 555 the service provider server 240 may consolidate the ads from the sponsored search server in block 510, with the ads retrieved from the content match server in block 550. The consolidation of the ads may include removing any duplicate ads and ordering the ads based on any of the aforementioned metrics, such as bid amount or eCPM value. At block 560 the service provider server 240 may add the advertisements to the search results page and serve the advertisements and/or search results to the user A 120A, such as via the network 230.

Figure 6:
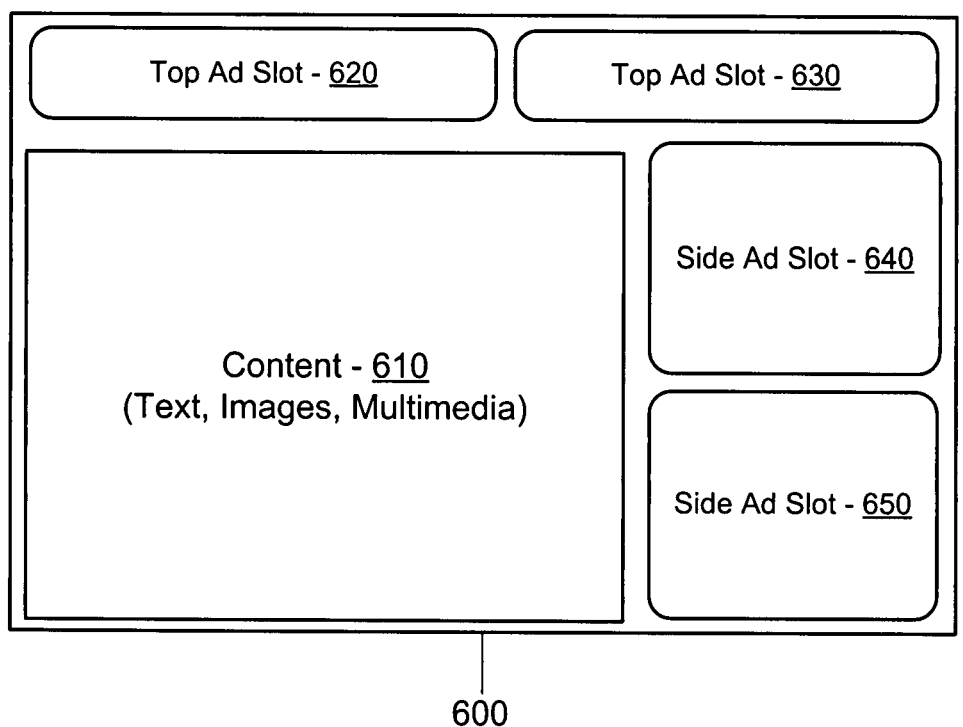
FIG. 6 is an illustration of an exemplary page displaying advertisements.

FIG. 6 illustrates an exemplary page 600 displaying advertisements. The page 600 may be served by the service provider 130 to the users 120A-N and may be a web page displayed on the Internet. The page 600 may include content 620, such as a list of search results, which may generally be the purpose of the page. The page 600 may be shown with slots for four advertisements. There may be two top ad slots 520, 530 and two side ad slots 540, 550. The service provider 130 may attempt to fill the ad slots 520, 530, 540, 550 with advertisements from the sponsored search server 320, or in accordance with the operations of FIG. 4. The service provider 130 may first attempt to fill the ad slots 520, 530, 540, 550 with advertisements retrieved from the sponsored search server 320. However, if the sponsored search server 320 does not return enough advertisements to fill all the ad slots 520, 530, 540, 550, the service provider 130 may fill the slots with advertisements retrieved in accordance with the operations of FIG. 4.

Figure 7:
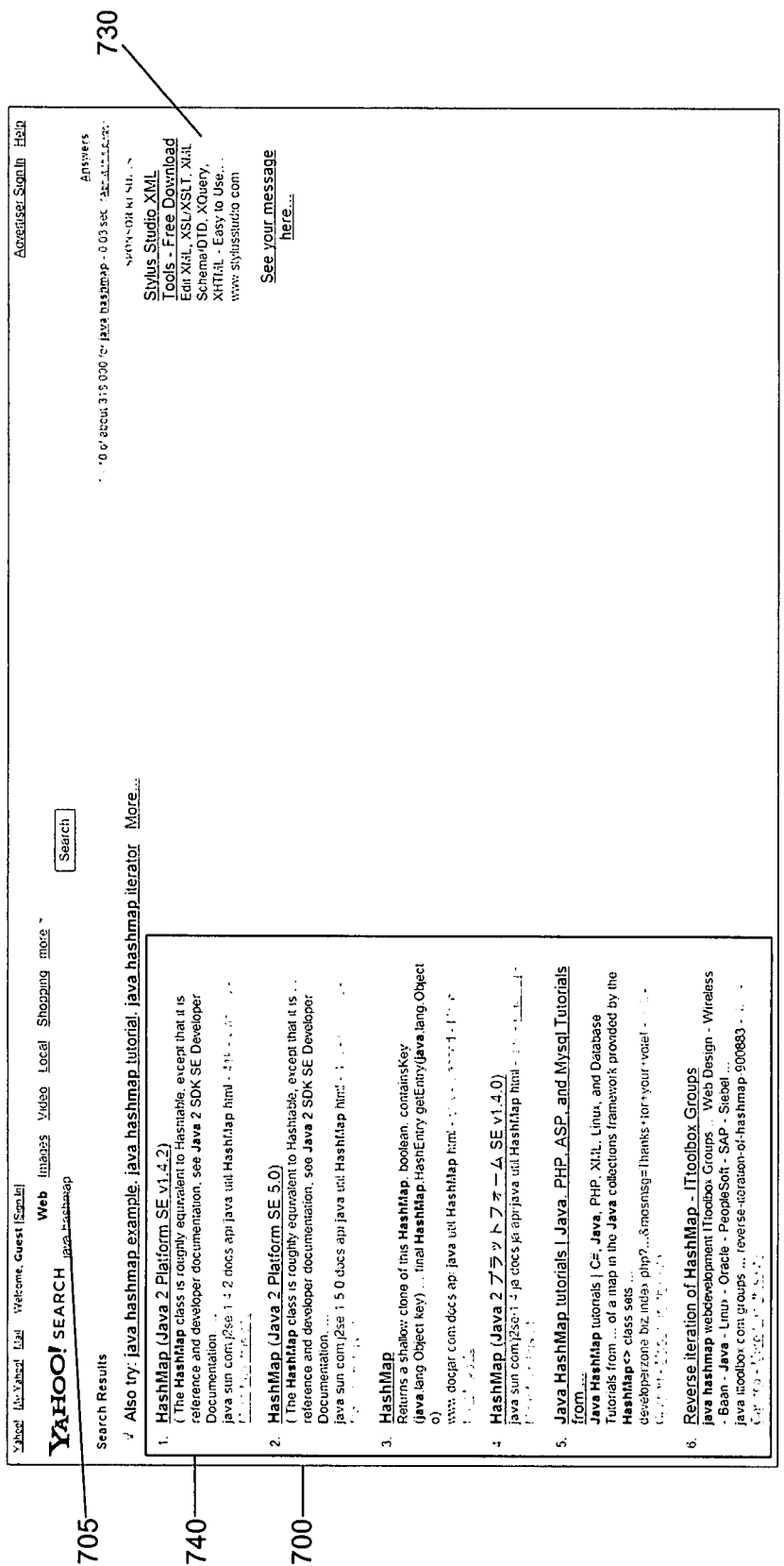
FIG. 7 is a screenshot of a page displaying advertisements to the users 120-N on a search results page served from a system not implementing the system of FIG. 1 or other systems for serving data that matches content related to a search results page.

FIG. 7 is a screenshot of a page 700 displaying advertisements to the users 120-N served from a search engine marketing system not implementing a system for serving data that matches content related to a search results page. The page 700 may include a search query 705, a content 710, and a side ads 730. The side ads 730 may have been retrieved from the data store 310, by the sponsored search server 320, based on the search query 705. The data store 310 may have only contained one advertisement relating to the search query 705 for display in the side ads 730. The page 700 may demonstrate that the side ads 730 may have had space for several more advertisements. Since the sponsored search server 310 may not have returned enough advertisements and the search engine marketing system did not implement a system for serving advertisements matching content, or any other means of retrieving advertisements on a search results page, the side ads 730 were mostly unfilled. The search query 705 may demonstrate a set of search keywords, "java hashmap" which may not return enough ads from the sponsored search server 320 to fill the ad slots on the search results page. In this instance the service provider server 240 may then request ads matched to the content of the search results page or the behavior of the users 120A-N.

Figure 8:
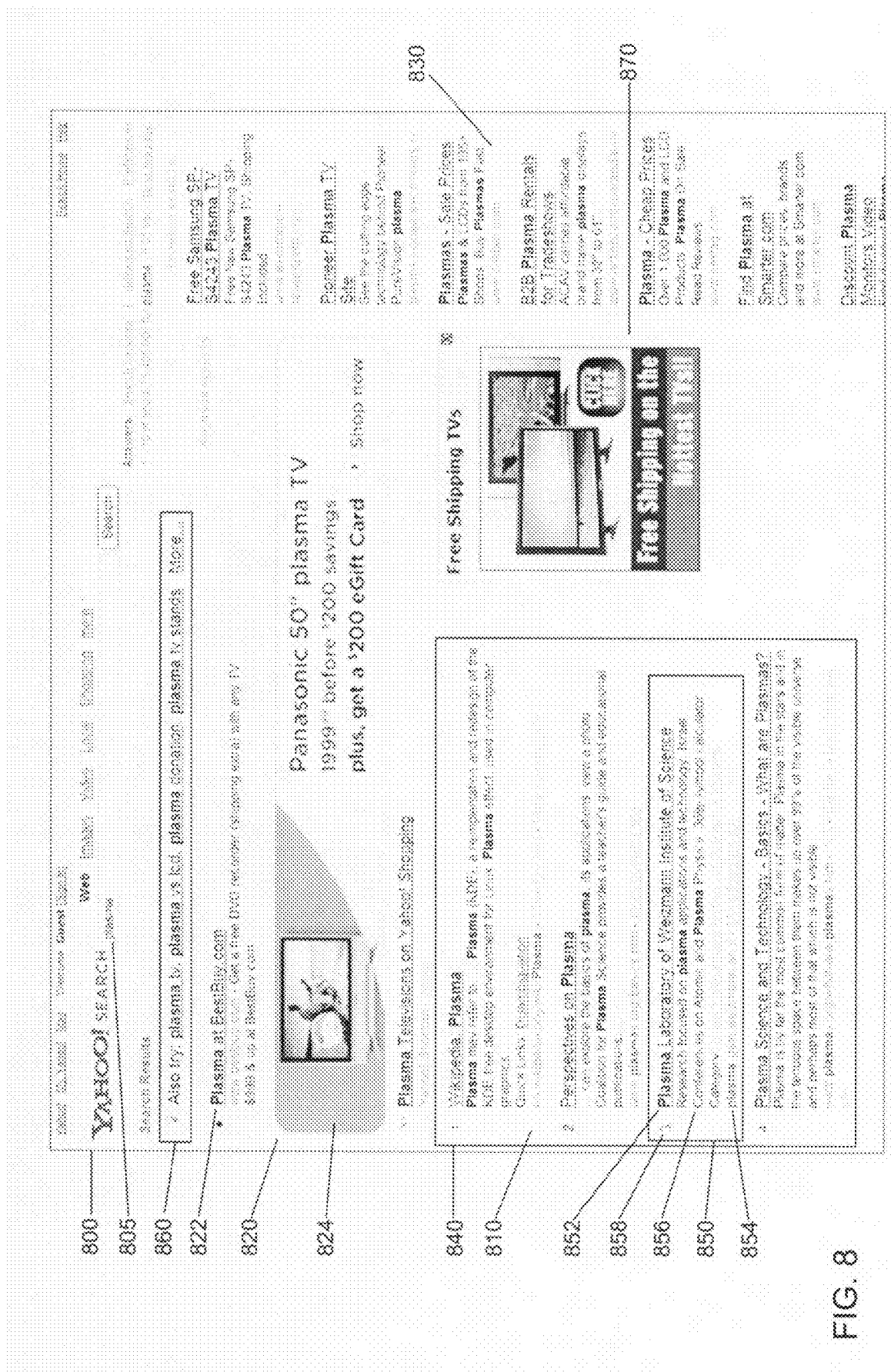
FIG. 8 is a screenshot of a search results page displaying advertisements to the users 120-N served from a system implementing the system of FIG. 1 or other systems for serving data that matches content related to a search results page.

FIG. 8 is a screenshot of a page 800 displaying advertisements to the users 120A-N served from a search engine marketing system implementing a system for serving data that matches content related to a search results page. The page 800 may be displayed to one of the users 120A-N, such as the user A 120A, when the user A 120A searches for the term "plasma." The page 800 may include a search query 805, content 810, query suggestions 860, top ads 820, side ads 830 and a popup ad 870. The content 810 may include a search results list 840 based on the search query 805 submitted by the user A 120A, such as "plasma". The search results list 840 may include one or more search results 850. A search result 850 may include a title link 852, a URL 854, a description 856 and a rank 858. The top ads 820 may include a sponsor listing 822 and a banner ad 824. The side ads 830 include sponsored listings. The query suggestions 860 may represent queries that were suggested by the service provider 130. The queries may represent phrases similar to the search query 805 that users 120A-N searched for.

The title link 852 may be a clickable link that may reference a site. If one the users 120A-N, such as the user A 120A, clicks on the title link 852, the user A 120A may be forwarded to the site referred to by the title link 852. The site referred to by the title link 852 may be described in the description 856. The URL 854 may represent the URL of the site referred to by the link 852. The rank 858 may represent the order of the search result 850 in the search results list 840.

The service provider 130 may have submitted any part of the page 800, including any part of the content 810 to the analysis server 350, such as the text of the title link 852 and the description 856. The service provider 130 may only submit the text of the title link 852 and description 856 of the first five, ten, or N advertisements, to the analysis server 350, N being any other number. Alternatively or in addition the service provider may submit all or part of the search query 805 and all or part of the suggested queries 860 to the analysis server 350. The service provider 130 may have returned one or more advertisements, in the form of the sponsored listing 822, the banner ad 824, the popup ad 870 and/or the sponsored listings of the side ads 830.

The top ads 820 and the side ads 830 may include any combination of sponsored listings, banner ads and popup ads. The top ads 820 and the side ads 830 may represent advertisements that may have been retrieved from the sponsored search server 320, the content match server 330 or in accordance with the operations of FIG. 4. In some instances the search query 805 may produce more advertisements form the content match server 330 than from the sponsored search server 320, such as "Britney Spears and Paris Hilton Pictures." It is unlikely that one of the revenue generators 110A-N may have bid on this search query. However, it is likely that there may be several advertisements that may be matched to the search results page produced by this search query.

The sponsored listing 822 and/or the banner ad 824 may link the users 120A-N to the web site of a revenue generator, such as the revenue generator A 110A, when the users 120A-N click on the banner ad 824 and/or the sponsored listing 822. The banner ad 824 may be constructed from an image (GIF, JPEG, PNG), a JavaScript program or a multimedia object employing technologies such as Java, Shockwave or Flash. The banner ad 824 may employ animation, video, or sound to maximize presence. The images used in the banner ad 824 may be in a high-aspect ratio shape (i.e. either wide and short, or tall and narrow).

The popup ad 870 may link the users 120A-N to the web site of a revenue generator, such as the revenue generator A 110A, when the users 120A-N click on the popup ad 870. The popup ad 870 may be constructed from an image (GIF, JPEG, PNG), a JavaScript program or a multimedia object employing technologies such as Java, Shockwave or Flash. The popup ad 870 may employ animation, video, or sound to maximize presence. The popup ad 870 may run in the same window as the page, or may open in a new window. The popup ad 870 may be capable of being closed and/or minimized by clicking on an 'X' in the corner of the popup ad 870.

FIG. 9 illustrates a general computer system 900, which may represent a service provider server 240, a third party server 250, an advertising services server 260 or any of the other computing devices referenced herein. The computer system 900 may include a set of instructions 924 that may be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 900 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 924 (sequential or otherwise) that specify actions to be taken by that machine. In a particular embodiment, the computer system 900 may be implemented using electronic devices that provide voice, video or data communication. Further, while a single computer system 900 may be illustrated, the term "system" shall also be taken to include any collection of systems or subsystems that individually or jointly execute a set, or multiple sets, of instructions to perform one or more computer functions.

As illustrated in FIG. 9, the computer system 900 may include a processor 902, such as, a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 904 may include a cache or random access memory for the processor 902. Alternatively or in addition, the memory 904 may be separate from the processor 902, such as a cache memory of a processor, the system memory, or other memory. The memory 904 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 904 may be operable to store instructions 924 executable by the processor 902. The functions, acts or tasks illustrated in the figures or described herein may be performed by the programmed processor 902 executing the instructions 924 stored in the memory 904. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 900 may further include a display 914, such as a liquid crystal display (LCD), an organic light emitting diode (OLED), a flat panel display, a solid state display, a cathode ray tube (CRT), a projector, a printer or other now known or later developed display device for outputting determined information. The display 914 may act as an interface for the user to see the functioning of the processor 902, or specifically as an interface with the software stored in the memory 904 or in the drive unit 906.

Additionally, the computer system 900 may include an input device 912 configured to allow a user to interact with any of the components of system 900. The input device 912 may be a number pad, a keyboard, or a cursor control device, such as a mouse, or a joystick, touch screen display, remote control or any other device operative to interact with the system 900.

The computer system 900 may also include a disk or optical drive unit 906. The disk drive unit 906 may include a computer-readable medium 922 in which one or more sets of instructions 924, e.g. software, can be embedded. Further, the instructions 924 may perform one or more of the methods or logic as described herein. The instructions 924 may reside completely, or at least partially, within the memory 904 and/or within the processor 902 during execution by the computer system 900. The memory 904 and the processor 902 also may include computer-readable media as discussed above.

The present disclosure contemplates a computer-readable medium 922 that includes instructions 924 or receives and executes instructions 924 responsive to a propagated signal; so that a device connected to a network 235 may communicate voice, video, audio, images or any other data over the network 235. Further, the instructions 924 may be transmitted or received over the network 235 via a communication interface 918. The communication interface 918 may be a part of the processor 902 or may be a separate component. The communication interface 918 may be created in software or may be a physical connection in hardware. The communication interface 918 may be configured to connect with a network 235, external media, the display 914, or any other components in system 900, or combinations thereof. The connection with the network 235 may be a physical connection, such as a wired Ethernet connection or may be established wirelessly as discussed below. Likewise, the additional connections with other components of the system 900 may be physical connections or may be established wirelessly. In the case of a service provider server 240, a third party server 250, an advertising services server 260, the servers may communicate with users 120A-N and the revenue generators 110A-N through the communication interface 918.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 922 may be a single medium, or the computer-readable medium 922 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 922 may include a solid-state memory such as a memory card or other package that houses one or more non-volatile read-only memories. The computer-readable medium 922 also may be a random access memory or other volatile re-writable memory. Additionally, the computer-readable medium 922 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A method for serving data that matches content related to a search results page, comprising:
    receiving a query from a user through a user interface displayed on a user device;
    retrieving a first number of search results related to the query;
    retrieving a second number of sponsored advertisements related to the query from a sponsored search server;
    determining an amount of available space for additional advertisements on a display screen of the user device using the first number of search results and the second number of sponsored advertisements;
    determining a third number of additional advertisements that may be displayed on the user device based on the amount of available space on the display screen;
    retrieving the third number of additional advertisements from a content match server based on a contextual analysis of the search results and sponsored advertisements;
    consolidating the search results, sponsored advertisements, and additional advertisements to form a consolidated set of results to display on the display screen of the user device; and
    displaying the consolidated set of results on the display screen of the user device.

2. The method of claim 1, further comprising processing the content of the search results and sponsored advertisements to generate a set of terms representing a contextual analysis of the search results and sponsored advertisements.

3. The method of claim 1, wherein consolidating the search results, sponsored advertisements, and additional advertisements to form a consolidated set of results further comprises:
    ordering the sponsored advertisements and additional advertisements based on within the consolidated set of results based on bid value.

4. The method of claim 2, wherein the processing the content of the search results and sponsored advertisements to generate the set of terms comprises processing the first number of search results and the second number of sponsored advertisements using a semantic analysis to generate representative terms of phrases in the search results and sponsored search results.

5. The method of claim 4, further comprising querying the content match server with the representative terms to retrieve the third number of additional advertisements from the content match server related to the representative terms.

6. The method of claim 1, wherein the sponsored advertisements comprise at least one of: a sponsored listing, a banner advertisement and a pop up advertisement.

7. The method of claim 1, wherein the user interface is a touch screen.

8. The method of claim 7, wherein the amount of available space on the display screen is based on available space on the touch screen.

9. The method of claim 1, wherein the first number of search results and second number of sponsored search results are not sufficient to fill the entire amount of available space on the display screen of the user device.

10. The method of claim 1, wherein the user device is a mobile device.

11. A method for serving data on a search results page that matches user behavior data, comprising:
  identifying a search results page related to a query requested by a user using a user device, the search results page comprising a number of search results related to the query;
  determining a first number of search results;
  identifying a user behavior data describing a historical behavior of one or more users;
  processing the user behavior data using a plurality of sponsored data matching tactics to generate a set of terms representing the user behavior data;
  retrieving a set of additional sponsored search results from a sponsored search server related to the set of terms by matching the set of terms to the sponsored search results using the plurality of sponsored data matching tactics;
  determining a second number of the additional sponsored search results that may be displayed on a display screen of the user device using the first number of search results;
  adding, from the set of additional sponsored search results, the second number of additional sponsored search results to the first number of search results to form a consolidated set of search results;
  displaying the consolidated set of search results on the display screen of the user device.

12. The method of claim 11 wherein the user behavior data comprises data describing a historical behavior of a set of users sharing a common behavioral characteristic with the user.

13. The method of claim 11 wherein the additional sponsored search results comprises at least one of: a sponsored listing, a banner advertisement and a popup advertisement.

14. The method of claim 11 wherein the user device is a mobile device and the second number of the additional sponsored search results is based on an amount of additional results that may be displayed on the mobile device at a single time.

15. The method of claim 11 wherein additional space is remaining on the display screen of the user device when a minimum amount of search results can not be retrieved based on the query.

16. The method of claim 15 wherein an analyzer processes the search results to extract keywords from the search results, and wherein the set of additional sponsored search are further determined using the extracted keywords.

\* \* \* \* \*